Patented Oct. 10, 1922.

1,431,470

UNITED STATES PATENT OFFICE.

ARTHUR LAPWORTH, OF MANCHESTER, ENGLAND.

MANUFACTURE AND PRODUCTION OF N-MONOALKYL DERIVATIVES OF AROMATIC COMPOUNDS.

No Drawing.   Application filed June 10, 1919.   Serial No. 303,156.

*To all whom it may concern:*

Be it known that I, ARTHUR LAPWORTH, a subject of the King of Great Britain and Ireland, and a resident of Manchester, in the county of Lancaster, England, have invented certain Improvements in the Manufacture and Production of N-Monoalkyl Derivatives of Aromatic Compounds, of which the following is a specification.

This invention relates to the manufacture and production of N-monoalkyl derivatives of certain aromatic amino compounds.

The monoalkylation of an amine by treating its benzylidene compound with an alkyliodide and hydrolysing the product thus obtained has been successfully achieved with bornylamine a derivative of camphor. The process failed, however, when applied to β-naphthylamine and phenylhydrazine.

We have now discovered that the aldehyde derivatives of—

(1) $p$-substituted amines and their derivatives of the benzene, naphthalene or other aromatic series, or (2) such other amines of these series and their derivatives which do not either as amines or as N-alkylamines react in the presence of acids with the required aldehydes in such a manner as to produce amino derivatives of diarylmonoalkyl- or of triarylmethanes, yield on treatment with alkylating agents, for instance alkyl sulphates and alkyl esters of benzene sulphonic acid, N-monoalkyl substitution products. These compounds are decomposed on being hydrolysed, the aldehyde being eliminated with formation of a salt of an N-monoalkyl derivative of the amine. The free monoalkyl base can be obtained from the salt in the usual way.

The following examples will serve as illustrations of how the invention may be carried into effect, the parts being by weight.

Example 1.

A mixture of 20 parts of benzylidene-$p$-amidophenol and 100 parts of benzene is boiled under a reflux condenser on the water-bath and 14.5 parts of dimethyl sulphate (freshly purified and distilled) are then added thereto. The boiling is then continued for seven and a half hours, the mixture being well stirred. 14 parts of concentrated hydrochloric acid and a little water are thereupon added and the whole is distilled with steam. The benzylidene product is hydrolysed and the benzene and benzaldehyde pass over with the steam. The remaining clear aqueous solution is concentrated to a small bulk and the bases are liberated from their salts by the addition of sodium carbonate. They consist of a mixture of $p$-aminophenol (about 25–30%) and $p$-methylaminophenol (about 70–75%) and the $p$-methylaminophenol can be separated therefrom by any of the well-known methods, for instance, by treating the mixture, after the addition of hydrochloric acid, with sodium nitrate, separating the soluble diazo compound from the insoluble nitroso-methylamino-$p$-phenol by filtration and washing, and eliminating after thorough washing the nitroso group from the nitroso-methylamino-$p$-phenol by treatment with tin and hydrochloric acid. Only negligible quantities of the dialkyl base were found in the reaction product.

Example 2.

A mixture of 20 parts of benzylidene-$p$-toluidine, 72 parts of benzene and 14 parts of dimethyl sulphate is boiled on the water-bath for two hours and, after the addition of hydrochloric acid and water, a current of steam is passed through to remove the benzaldehyde and benzene. The yield of N-monomethyl-$p$-toluidine was about 60% of the theoretical yield. The remainder was unaltered $p$-toluidine and very small quantities of dimethyl-$p$-toluidine and quaternary base.

Example 3.

20 parts of the benzylidene derivative of 1-bromo-2-naphthylamine are dissolved in 50 parts of boiling benzene and 6.9 parts of dimethyl sulphate (freshly purified and distilled) are added to the solution. The boiling is then continued for 10 hours. After the subsequent addition of hydrochloric acid and water, and distillation with steam, the residual liquid is allowed to cool and is then made alkaline with sodium carbonate. The precipitated bases are, if necessary, extracted with a solvent, e. g., benzene or chloroform, and recovered from the solution by removal of the solvent. The residue is dissolved in excess of hydrochloric acid and then treated in the usual way with sodium nitrate. The nitroso compound of 1-bromo-2-naphthylamine separates in yellow crystals, melting after recrystallisation from petroleum at from 108°–110° C. The nitroso group is then removed by treatment with tin and hydrochloric acid and the hydrochloride of 1-bromo-2-methylamino-naphthylene is obtained in crystals (M. P. 179°–181° C.) which are soluble in hydrochloric acid, but are largely dissociated by water. The free base is a low melting solid and tends to persist as a fluid at ordinary temperature.

I do not limit myself to the examples given and instead of the condensation product of benzaldehyde with the amines, condensation products of other aldehydes with amines can be used. The diluent benzene can be replaced by solvents of suitable character, for instance, toluene, xylene, nitrobenzene, etc. Furthermore, other processes may be employed for obtaining the pure N-monoalkyl body from the product of reaction.

What I claim as my invention, and desire to secure by Letters Patent is:—

1. The process of producing N monoalkyl derivatives of aromatic compounds which comprises boiling a condensation product of aromatic aldehydes with amines, with a solvent of the benzene series, then adding dimethyl sulphate and continuing the boiling, then adding hydrochloric acid and water and distilling with steam to remove the benzene compounds.

2. The process of producing N monoalkyl derivatives of aromatic compounds which comprises boiling a condensation product of aromatic aldehydes with amines, with a solvent of the benzene series, then adding dimethyl sulphate and continuing the boiling, then adding hydrochloric acid and water, distilling with steam to remove the benzene compounds, concentrating the remaining clear aqueous solution, and then liberating the bases with sodium carbonate.

3. The process of producing N monoalkyl derivatives of aromatic compounds which comprises boiling a mixture of 20 parts by weight of a condensation product of aromatic aldehydes with amines, and 72–100 parts by weight of a solvent of the benzene series, then adding dimethyl sulphate and boiling further, then adding hydrochloric acid and water and distilling with steam to remove the benzene compounds.

4. The process of producing N monoalkyl derivatives of aromatic compounds which comprises boiling a mixture of 20 parts by weight of a condensation product of aromatic aldehydes with amines, and 72–100 parts by weight of a solvent of the benzene series, then adding 14 parts by weight of dimethyl sulphate and boiling further, then adding hydrochloric acid and water and distilling with steam to remove the benzene compounds.

5. The process of producing N monoalkyl derivatives of aromatic compounds which comprises boiling a mixture of 20 parts by weight of a condensation product of aromatic aldehydes with amines, and 72–100 parts by weight of a solvent of the benzene series, then adding dimethyl sulphate and boiling further, then adding hydrochloric acid and water, distilling with steam to remove the benzene compounds concentrating the remaining clear aqueous solution, and then liberating the bases with sodium carbonate.

6. The process of producing N monoalkyl derivatives of aromatic compounds which comprises boiling a mixture of 20 parts by weight of a condensation product of aromatic aldehydes with amines, and 72–100 parts by weight of a solvent of the benzene series, then adding 14 parts by weight of dimethyl sulphate and boiling further, then adding hydrochloric acid and water, distilling with steam to remove the benzene compounds concentrating the remaining clear aqueous solution, and then liberating the bases with sodium carbonate.

7. The process of producing N monoalkyl derivatives of aromatic compounds which comprises boiling a condensation product of aromatic aldehydes with amines, with a solvent of the benzene series, then adding dimethyl sulphate and continuing the boiling, then adding hydrochloric acid and water and distilling with steam to remove the benzene compounds, cooling the remaining solution and rendering alkaline with sodium carbonate to liberate the bases.

8. The process of producing N monoalkyl derivatives of aromatic compounds which comprises boiling a condensation product of aromatic aldehydes and amines, with benzene, then adding dimethyl sulphate and continuing boiling for at least one hour, then adding hydrochloric acid and water, and distilling with a current of stream to remove the benzene compounds and then liberating the bases by treating the solution with sodium carbonate.

In witness whereof I have hereunto set my hand.

ARTHUR LAPWORTH.